（12) United States Patent
Kacherginsky

(10) Patent No.: US 11,544,045 B2
(45) Date of Patent: Jan. 3, 2023

(54) AUTOMATIC SMART CONTRACT ANALYSIS

(71) Applicant: Coinbase, Inc., San Francisco, CA (US)

(72) Inventor: Peter Kacherginsky, San Francisco, CA (US)

(73) Assignee: Coinbase, Inc., San Francisco, CA (US)

( * ) Notice: Subject to any disclaimer, the term of this patent is extended or adjusted under 35 U.S.C. 154(b) by 0 days.

(21) Appl. No.: 17/351,305

(22) Filed: Jun. 18, 2021

(65) Prior Publication Data

US 2022/0179626 A1 Jun. 9, 2022

Related U.S. Application Data

(60) Provisional application No. 63/189,440, filed on May 17, 2021, provisional application No. 63/122,087, filed on Dec. 7, 2020.

(51) Int. Cl.
| | |
|---|---|
| *G06F 8/41* | (2018.01) |
| *H04L 9/32* | (2006.01) |
| *G06F 8/73* | (2018.01) |
| *H04L 9/00* | (2022.01) |

(52) U.S. Cl.
CPC ............... *G06F 8/427* (2013.01); *G06F 8/73* (2013.01); *H04L 9/3236* (2013.01); *H04L 9/50* (2022.05)

(58) Field of Classification Search
CPC ......... G06F 8/427; G06F 8/73; H04L 9/3263; H04L 9/50
See application file for complete search history.

(56) References Cited

U.S. PATENT DOCUMENTS

| | | | |
|---|---|---|---|
| 11,106,458 B2 * | 8/2021 | Adams | ................... G06F 8/70 |
| 11,277,261 B2 * | 3/2022 | Angelo | ................ H04L 9/3239 |
| 2019/0305959 A1 | 10/2019 | Reddy et al. | |
| 2020/0201838 A1 | 6/2020 | Ciocarlie et al. | |
| 2020/0327252 A1 | 10/2020 | Mcfall et al. | |

OTHER PUBLICATIONS

Feb. 15, 2022—(WO) International Search Report and Written Opinion—App PCT/US21/62030.

* cited by examiner

*Primary Examiner* — Wei Y Zhen
*Assistant Examiner* — Amir Soltanzadeh
(74) *Attorney, Agent, or Firm* — Banner & Witcoff, Ltd.

(57) ABSTRACT

One or more aspects described herein provide automatic smart contract feature analysis and risk assessment based on unique source code signatures and/or fingerprints within the smart contract. A risk assessment engine may automatically analyze a smart contract by first retrieving smart contract source code from a contract address on a blockchain where the smart contract is accessible. The risk assessment engine may generate an abstract syntax tree (AST) of the smart contract using a compiler for the smart contract source code, and then flatten the AST by removing non-differentiating elements from the AST. The flattened AST may be divided by function calls within the smart contract, and then each division may be fingerprinted, e.g., hashed using a one-way hash. The fingerprint is compared to a database of known functions to automatically identify one or more features of the smart contract with associated risk levels.

20 Claims, 16 Drawing Sheets

```
...
contract LinkToken is StandardToken, ERC677Token { uint public constant totalSupply = 10**27;
  string public constant name = 'ChainLink Token';
  uint8 public constant decimals = 18;
  string public constant symbol = 'LINK';

function LinkToken()
    public
  {
    balances[msg.sender] = totalSupply;
  }

/**
  * @dev transfer token to a specified address with additional data if the
  recipient is a contract.
  * @param _to The address to transfer to.
  * @param _value The amount to be transferred.
  * @param _data The extra data to be passed to the receiving contract.
  */
  function transferAndCall(address _to, uint _value, bytes _data)
    public
    validRecipient(_to)
    returns (bool success)
  {
    return super.transferAndCall(_to, _value, _data);
  }

/**
  * @dev transfer token to a specified address.
  * @param _to The address to transfer to.
  * @param _value The amount to be transferred.
  */
  function transfer(address _to, uint _value)
    public
    validRecipient(_to)
    returns (bool success)
  {
    return super.transfer(_to, _value);
  }

```
(From Fig. 3A)

/**
   * @dev Approve the passed address to spend the specified amount of tokens
on behalf of msg.sender.
   * @param _spender The address which will spend the funds.
   * @param _value The amount of tokens to be spent.
   */
  function approve(address _spender, uint256 _value)
    public
    validRecipient(_spender)
    returns (bool)
  {
    return super.approve(_spender, _value);
  }

/**
   * @dev Transfer tokens from one address to another
   * @param _from address The address which you want to send tokens from
   * @param _to address The address which you want to transfer to
   * @param _value uint256 the amount of tokens to be transferred
   */
  function transferFrom(address _from, address _to, uint256 _value)
    public
    validRecipient(_to)
    returns (bool)
  {
    return super.transferFrom(_from, _to, _value);
  }

// MODIFIERS modifier validRecipient(address _recipient) {
    require(_recipient != address(0) && _recipient != address(this));
    _;
  }
}
```

```
},
{
"attributes" :
{
"argumentTypes" : null,
"overloadedDeclarations" :
{
null
},
"referencedDeclaration" :
466,
"type" : "bytes memory",
"value" : "_data"
},
"id" : 512,
"name" : "Identifier",
"src" : "6500:5:0"
},
{
"id" : 513,
"name" : "FunctionCall",
"src" : "6470:36:0"
},
{
"id" : 514,
"name" :
"ExpressionStatement",
"src" : "6470:36:0"
},
{
"id" : 515,
"name" : "Block",
"src" : "6461:53:0"
},
{
"id" : 516,
"name" : "IfStatement",
"src" : "6440:74:0"
},
{
"attributes" :
{
"FunctionReturnParameters" :
490
},
"children" :
{
{
"attributes" :
{
"argumentTypes" : null,
"hexvalue" : "74727565",
"isConstant" : false,
"isLValue" : false,
"isPure" : true,
"lValueRequested" : false,
"subdenomination" : null,
"token" : "bool",
"type" : "bool",
"value" : "true"
},
"id" : 517,
"name" : "Literal",
"src" : "6527:4:0"
},
{
"id" : 518,
"name" : "Return",
"src" : "6520:11:0"
}
```
```
},
"id" : 519,
"name" : "Block",
"src" : "6352:185:0"
},
{
"id" : 520,
"name" :
"FunctionDefinition",
"src" : "6245:292:0"
},
```

FIG. 4D

```
FunctionDefinition|constant:false|implemented:true|isConstructor:false|modifier
s:[\u003cnil\
u003e]|name:transferAndCall|payable:false|visibility:public|ParameterList|Varia
bleDeclaration|constant:false|name:_to|stateVariable:false|storageLocation:defa
ult|type:address|value:\u003cnil\
u003e|visibility:internal|ElementaryTypeName|name:address|type:address|Variable
Declaration|constant:false|name:_value|stateVariable:false|storageLocation:defa
ult|type:uint256|value:\u003cnil\
u003e|visibility:internal|ElementaryTypeName|name:uint|type:uint256|VariableDec
laration|constant:false|name:_data|stateVariable:false|storageLocation:default|
type:bytes memory|value:\u003cnil\
u003e|visibility:internal|ElementaryTypeName|name:bytes|type:bytes storage
pointer|ParameterList|VariableDeclaration|constant:false|name:success|stateVari
able:false|storageLocation:default|type:bool|value:\u003cnil\
u003e|visibility:internal|ElementaryTypeName|name:bool|type:bool|Block|Expressi
onStatement|FunctionCall|isConstant:false|isLValue:false|isPure:false|isStructC
onstructorCall:false|lValueRequested:false|names:[\u003cnil\
u003e]|type:bool|type_conversion:false|MemberAccess|isConstant:false|isLValue:f
alse|isPure:false|lValueRequested:false|member_name:transfer|type:function
(address,uint256) returns (bool)|Identifier|type:contract super
ERC677Token|value:super|Identifier|type:address|value:_to|Identifier|type:uint2
56|value:_value|ExpressionStatement|FunctionCall|isConstant:false|isLValue:fals
e|isPure:false|isStructConstructorCall:false|lValueRequested:false|names:[\
u003cnil\u003e]|type:tuple()|type_conversion:false|Identifier|type:function
(address,address,uint256,bytes
memory)|value:Transfer|MemberAccess|isConstant:false|isLValue:false|isPure:fals
e|lValueRequested:false|member_name:sender|type:address|Identifier|type:msg|val
ue:msg|Identifier|type:address|value:_to|Identifier|type:uint256|value:_value|I
dentifier|type:bytes memory|value:_data|IfStatement|falseBody:\u003cnil\
u003e|FunctionCall|isConstant:false|isLValue:false|isPure:false|isStructConstru
ctorCall:false|lValueRequested:false|names:[\u003cnil\
u003e]|type:bool|type_conversion:false|Identifier|type:function (address)
returns
(bool)|value:isContract|Identifier|type:address|value:_to|Block|ExpressionState
ment|FunctionCall|isConstant:false|isLValue:false|isPure:false|isStructConstruc
torCall:false|lValueRequested:false|names:[\u003cnil\
u003e]|type:tuple()|type_conversion:false|Identifier|type:function
(address,uint256,bytes
memory)|value:contractFallback|Identifier|type:address|value:_to|Identifier|typ
e:uint256|value:_value|Identifier|type:bytes
memory|value:_data|Return|Literal|hexvalue:74727565|isConstant:false|isLValue:f
alse|isPure:true|lValueRequested:false|subdenomination:\u003cnil\
u003e|token:bool|type:bool|value:true
```

```
{
"Hash": "3ee09ec574744840001f024d57db0a57f4986733e71f8355bf8cd7af08e03ef4",
"Name": "transferAndCall(address,uint256,bytes memory)",
"Mutability": "nonpayable",
"Sig":
"FunctionDefinition|constant:false|implemented:true|isConstructor:false|modifiers:[\
u003cnil\
u003e]|name:transferAndCall|payable:false|visibility:public|ParameterList|VariableDeclar
ation|constant:false|name:_to|stateVariable:false|storageLocation:default|type:address|v
alue:\u003cnil\
u003e|visibility:internal|ElementaryTypeName|name:address|type:address|VariableDeclarati
on|constant:false|name:_value|stateVariable:false|storageLocation:default|type:uint256|v
alue:\u003cnil\
u003e|visibility:internal|ElementaryTypeName|name:uint|type:uint256|VariableDeclaration|
constant:false|name:_data|stateVariable:false|storageLocation:default|type:bytes
memory|value:\u003cnil\
u003e|visibility:internal|ElementaryTypeName|name:bytes|type:bytes storage
pointer|ParameterList|VariableDeclaration|constant:false|name:success|stateVariable:fals
e|storageLocation:default|type:bool|value:\u003cnil\
u003e|visibility:internal|ElementaryTypeName|name:bool|type:bool|Block|ExpressionStateme
nt|FunctionCall|isConstant:false|isLValue:false|isPure:false|isStructConstructorCall:fal
se|lValueRequested:false|names:[\u003cnil\
u003e]|type:bool|type_conversion:false|MemberAccess|isConstant:false|isLValue:false|isPu
re:false|lValueRequested:false|member_name:transfer|type:function (address,uint256)
returns (bool)|Identifier|type:contract super
ERC677Token|value:super|Identifier|type:address|value:_to|Identifier|type:uint256|value:
_value|ExpressionStatement|FunctionCall|isConstant:false|isLValue:false|isPure:false|isS
tructConstructorCall:false|lValueRequested:false|names:[\u003cnil\
u003e]|type:tuple()|type_conversion:false|Identifier|type:function
(address,address,uint256,bytes
memory)|value:Transfer|MemberAccess|isConstant:false|isLValue:false|isPure:false|lValueR
equested:false|member_name:sender|type:address|Identifier|type:msg|value:msg|Identifier|
type:address|value:_to|Identifier|type:uint256|value:_value|Identifier|type:bytes
memory|value:_data|IfStatement|falseBody:\u003cnil\
u003e|FunctionCall|isConstant:false|isLValue:false|isPure:false|isStructConstructorCall:
false|lValueRequested:false|names:[\u003cnil\
u003e]|type:bool|type_conversion:false|Identifier|type:function (address) returns
(bool)|value:isContract|Identifier|type:address|value:_to|Block|ExpressionStatement|Func
tionCall|isConstant:false|isLValue:false|isPure:false|isStructConstructorCall:false|lVal
ueRequested:false|names:[\u003cnil\
u003e]|type:tuple()|type_conversion:false|Identifier|type:function
(address,uint256,bytes
memory)|value:contractFallback|Identifier|type:address|value:_to|Identifier|type:uint256
|value:_value|Identifier|type:bytes
memory|value:_data|Return|Literal|hexvalue:74727565|isConstant:false|isLValue:false|isPu
re:true|lValueRequested:false|subdenomination:\u003cnil\
u003e|token:bool|type:bool|value:true",
"Source": [
"signatures/custom/LinkToken.sol:6245:292:0"
],
"Doc": "@dev transfer token to a contract address with additional data if the recipient
is a contact.\r\n@param _to The address to transfer to.\r\n@param _value The amount to
be transferred.\r\n@param _data The extra data to be passed to the receiving contract.\
r",
"Features": [
"externalcall"
]
}
```

FIG. 7

```
"externalcall": {
"Score": 2,
"Summary": "External address call",
"Details": "The contract may invoke another function on a
different smart contract in order to trigger functionality not
defined within the contract itself",
"Impact": "External address calls increase complexity and risk of
the smart contracts. External calls are a prerequisite to re-
entrantrancy vulnerabilities.",
"Monitor": false,
"Alert": false,
"Mitigations": []
```

FIG. 8

ERC-20 Security Assessment: ChainLink Token (LINK)

Auditor: Wilman Garcia
Solidity version: 1.2.3
Contract Source: 0x514910771af9ca656af840dff83e8264ecf986ca

Executive Summary

Date: 2021-05-12

Residual Security Risk Score: 2

Inherent Security Risk Score: 2

| Risk Score | Risk Description |
|---|---|
| 2 | External address call |
| 1 | Use of assembly instructions |

*\* Asset risks are calculated on the scale of 1-5 with 5 being the most severe.*

*No mitigations are necessary for this asset.*

Risk Details

ChainLink Token has the following risks:

2 | External address call

The contract may invoke another function on a different smart contract in order to trigger functionality not defined within the contract itself.

External address calls increase complexity and risk of the smart contracts. External calls are a prerequisite to re-entrancy vulnerabilities.

The following functions triggered this risk:

- contractFallback(address,uint256,bytes memory)
- transferAndCall(address,uint256,bytes memory)
- transferAndCall(address,uint256,bytes memory)

FIG. 9A

1 | Use of assembly instructions

Assembly instructions use low level interface to directly manipulate the Ethereum Virtual Machine (EVM) as opposed to using the high level Solidity language. For example, inline assembly can make low level calls to other contracts, manipulate storage slots directly, and circumvent developer protections offered by higher level languages.

The use of assembly instructions increases complexity and obfuscates functionality of the smart contract while circumventing some of the inherent compiler protections.

The following functions triggered this risk:

- isContract(address)

Mitigation Details

Implementation of the following risk mitigations drive the residual security risk score:

N/A

Circuit Breaker Monitoring

Slack Monitoring:
N/A
Slack and Pagerduty Monitoring:
N/A

Matching Function Signatures

Matching Function Signatures:

```
982afb9e84bbfded208268dcd3860be4fac7576697e56397edbfedd29dd9f5ff - add(uint256,uint256)
0f5d6c18af8bfe45551aea6c08ee98f2386d48771a399e98218754fb8b6d4fcc - isContract(address)
7711dedba7898d7ac3feca0c589c7868980afccbbf12c8e8b8512d8522be8ac4 - contractFallback(address,uint256,bytes_mem)
2229a8f7d2ea880e6ca714c04fbac5ae8861b494b6f447f42234f28891fcd8 - transferFrom(address,address,uint256)
bee09ec57474484008010348578bda5714806733e71f8353b18cd7af88e83ef4 - transferAndCall(address,uint256,bytes_mem)
5842818f5c6fb88bebd3aaa9ccc351afd104cedddc5a5d8785ff1ec33e3255d - div(uint256,uint256)
7547a121925de85995765ea987823a111910e888cbd5c57248286bf8aa77586 - sub(uint256,uint256)
83ad8da1a8d7d823a9f341936a3838fcd7cc35e4a318bd775a3f12d653bb65ab1 - balanceOf(address)
8d7634e8dec4fe45722318a4d8bf5c32d9178aaebb4412dfcaf5b5a78fff1138 - approve(address,uint256)
9a3731f778ba855bc63cbc8ec7371558035e4ba18227ae21289582d7f3f4af49 - decreaseApproval(address,uint256)
a98455aed8cf41a8e1418bc387ecdfcf1fb77f18a9fe18aa8bcbe2b8f24ea956 - transferAndCall(address,uint256,bytes_mem)
ade32bcddcb85783f58827d83d0081287d12c4c457527bbd2d827a72cceacdfe - transfer(address,uint256)
b75aa64e8dc25543b2984ebc4fb3ff8fb85dde2ef5c6481bd798a47223eb9219 - validRecipient(address)
c18981131bda115de8b7219f2fd2cb46c7aa8188827e3c16298bab13c8fcc99 - transferFrom(address,address,uint256)
c286cf1ef165a5f55e1ff82f71a22a82e5a034986a228afa4172d6485cfdfbdc - approve(address,uint256)
c482753ae6ba8345b982b3fd465be348bcd877eeed8bf9fb3af28a13c86d667 - increaseApproval(address,uint256)
e5a4c812fc1c513e9c97ff6f25286884dcae8fc854a5cf21dc8b0a8d78b3821 - mul(uint256,uint256)
af97f02d853f21d788624afa8386d4bd87919ab887e6b9998a6b2bf588bf941c8 - allowance(address,address)
fa0ad8abd9bbfbf4837564a35f968d74635ed843bc3b387287c1c4e5d83387 - transfer(address,uint256)
```

FIG. 9B

Matching Function Sources:

signatures/custom/ANLToken.sol
signatures/custom/ANKSToken.sol
signatures/custom/ANT.sol
signatures/custom/ArthurStandardToken.sol
signatures/custom/BAToken.sol
signatures/custom/CaspianToken.sol
signatures/custom/Flexacoin.sol
signatures/custom/KyberNetworkCrystal.sol
signatures/custom/LinkToken.sol
signatures/custom/MindsToken.sol
signatures/custom/MinUSToken.sol
signatures/custom/NKN_0x5cf8471Sba30137f1a3297addcf4b5035000cbeb/NNNToken.sol
signatures/custom/OriginToken.sol
signatures/custom/RepublicToken.sol
signatures/custom/RequestToken.sol
signatures/custom/Token.sol
signatures/custom/WaxToken.sol signatures/openzeppelin/openzeppelin-contracts-1.1.8/contracts/token/BasicToken.sol
signatures/openzeppelin/openzeppelin-contracts-1.1.8/contracts/token/StandardToken.sol
signatures/openzeppelin/openzeppelin-contracts-1.10.0/contracts/math/SafeMath.sol
signatures/openzeppelin/openzeppelin-contracts-1.11.0/contracts/math/SafeMath.sol
signatures/openzeppelin/openzeppelin-contracts-1.3.0/contracts/math/SafeMath.sol
signatures/openzeppelin/openzeppelin-contracts-1.3.0/contracts/token/BasicToken.sol
signatures/openzeppelin/openzeppelin-contracts-1.3.0/contracts/token/StandardToken.sol
signatures/openzeppelin/openzeppelin-contracts-1.4.0/contracts/math/SafeMath.sol
signatures/openzeppelin/openzeppelin-contracts-1.4.0/contracts/token/BasicToken.sol
signatures/openzeppelin/openzeppelin-contracts-1.4.0/contracts/token/StandardToken.sol
signatures/openzeppelin/openzeppelin-contracts-1.5.0/contracts/math/SafeMath.sol
signatures/openzeppelin/openzeppelin-contracts-1.5.0/contracts/token/BasicToken.sol
signatures/openzeppelin/openzeppelin-contracts-1.5.0/contracts/token/StandardToken.sol
signatures/openzeppelin/openzeppelin-contracts-1.6.0/contracts/math/SafeMath.sol
signatures/openzeppelin/openzeppelin-contracts-1.6.0/contracts/token/ERC20/BasicToken.sol
signatures/openzeppelin/openzeppelin-contracts-1.6.0/contracts/token/ERC20/StandardToken.sol
signatures/openzeppelin/openzeppelin-contracts-1.7.0/contracts/math/SafeMath.sol
signatures/openzeppelin/openzeppelin-contracts-1.7.0/contracts/token/ERC20/BasicToken.sol
signatures/openzeppelin/openzeppelin-contracts-1.7.0/contracts/token/ERC20/StandardToken.sol
signatures/openzeppelin/openzeppelin-contracts-1.9.0/contracts/math/SafeMath.sol Unknown Function Signatures:

None

FIG. 9C

```
function pause() onlyOwner whenNotPaused public {
    paused = true;
    Pause();
}
```

Signature:
```
function pause() onlyOwner whenNotPaused
public {
    paused = true;
    Pause();
}
```

New Contract:
```
function pause() onlyOwner whenNotPaused
public {
    paused = true;
    Pause();
}
```

FIG. 13

Signature:
```
function pause() onlyOwner whenNotPaused
public {
    paused = true;
    Pause();
}
```

New Contract:
```
function pause() onlyOwner whenNotPaused
public {
    paused = true;
    Pause();
}
```

FIG. 14

Signature:
```
function pause() onlyOwner whenNotPaused
public {
    paused = true;
    Pause();
}
```

New Contract:
```
// Pause the contract
function pause()
onlyOwner
whenNotPaused
public
{
    // Setting pause flag
    paused = true;

// Trigger Pause event
    Pause();
}
```

FIG. 15

Signature:
```
function pause() onlyOwner whenNotPaused
public {
    paused = true;
    Pause();
}
```

New Contract:
```
function pause() onlyOwner whenNotPaused
public {
    paused = false;
    Pause();
}
```

FIG. 16

Signature:
```
function pause() onlyOwner whenNotPaused
public {
    paused = true;
    Pause();
}
```

New Contract:
```
function pause() onlyOwner whenNotPaused
public {
    Pause();
    paused = true;
}
```

FIG. 17

AUTOMATIC SMART CONTRACT ANALYSIS

This application claims priority to provisional U.S. Application Ser. No. 63/122,087, filed Dec. 7, 2020, and provisional U.S. Application Ser. No. 63/189,440, filed May 17, 2021, each entitled "Automatic Smart Contract Analysis", and each of which is herein incorporated by reference in its entirety for all purposes.

FIELD

Aspects described herein generally relate to source code security, audit, and analysis. More specifically, one or more aspects described herein provide improvements in smart contract feature analysis and risk assessment based on one or more unique source code signatures or fingerprints within the smart contract.

BACKGROUND

Computer source code is typically written by software programmers, i.e., human beings who, whether they want to admit it or not, are prone to make mistakes and/or possibly have less than honorable intentions. A mistake in source code that prevents it from operating correctly is referred to as a bug. Other mistakes may include algorithmic errors or errors of omission which, even though the software behaves as intended, do not yield the desired results or might not be capable of handling all possible inputs or scenarios presented to it. Yet other areas of concern might include security oversights by failing to take into consideration appropriate security precautions or underlying flaws in a programming language, thereby leaving the software subject to a security vulnerability. In other scenarios, software may behave as its original developers intended, but if the developer is malicious then the software may expose features or risks that a third party subsequently using the software might not have chosen to implement had they written or developed the software themselves. Even worse, those features or risks might not be published or well known, leaving the third party susceptible to a cyber attack by the original developer of the software. Therefore, a third-party desiring to use software written by someone else is left with no choice but to perform a manual review of the source code when that third-party wants to ensure that the software does not include malicious code or present other security risks. This is a time intensive process that can take days to weeks, depending on the length and complexity of the source code that needs to be reviewed.

Blockchains are a particular type of database software that have been under continuous development and constant improvement since Satoshi Nakamoto first published "Bitcoin: A Peer-to-Peer Electronic Cash System" in 2008. At its essence, a blockchain is a type of database that stores data only after that data is agreed upon by computers linked in a peer-to-peer (p2p) network, and where each "block" of data must be agreed upon before another block of data can be added. Blockchain data is said to be immutable insofar as, once a block is added to the blockchain, it cannot be changed or removed. In addition, blockchain algorithms typically operate based on "trustless" protocols whereby none of the peers in the p2p network need to be affiliated with or trust each other in order for the block to be agreed upon and added to the Blockchain. To the contrary, it is actually preferable (and perhaps even required) that no single organization or entity controls greater than 50% of the peers on the network, because in such situations a majority actor could take over decision-making within many of the trustless protocols that blockchains use to add data to the blockchain. That majority actor could then add or alter data that might not otherwise be agreed upon by the entities acting reasonably when none of them has majority control. For this reason, blockchains are typically queryable by public APIs (often navigable via blockchain explorer web sites) so that their data can be readily audited, although some blockchains may remain private.

Blockchains can store any kind of data, although at their inception blockchains were primarily used to store digital tokens or cryptocurrency, such as Bitcoin (as used herein, "token" can refer to a cryptocurrency, virtual currency, digital token or any similar construct stored on a blockchain). Cryptocurrencies such as Bitcoin, however, merely use a blockchain as a means to transparently record their payment ledgers. Blockchains can also be used to immutably record any type of data, such as transaction data, votes in an election, product inventories and status, user identifications, deeds to homes, time and location information, and much more.

In order to store tokens for users, each user can have one or more wallet "addresses" on the blockchain to which tokens can be attributed. Each address is typically the public key of a public/private key pair in a PM infrastructure used by the blockchain. When one user sends some amount of tokens to another user, the sending user's wallet software generates the relevant payment information (sender, receiver, and amount), signs the data using the sending wallet's private key, and submits the transaction to the blockchain for acceptance. Once accepted, the amount of sent tokens become attributed to the receiving wallet rather than the sending wallet in the blockchain's token ledger.

As blockchains have developed, so have their capabilities. Some newer and more sophisticated blockchains allow users to run programs called smart contracts. A smart contract refers to a program that, once deployed, is stored as data on the blockchain itself and cannot be altered. Each smart contract has an associated address on the blockchain, and the source code of the smart contract defines how payments sent to the smart contract address are automatically processed and handled. Because the smart contract is stored on the blockchain itself, the source code for the smart contract can be audited by others to ensure the smart contract operates as intended or advertised. Smart contracts can be thought of as programs that act as self-executing contracts where the terms of the agreement between the buyer and the seller are directly written into lines of code. A user can send tokens directly to a wallet address associated with the smart contract, and the smart contract will execute based on the functions specified in its source code.

For example, a simple smart contract might act as a sort of flight cancellation insurance, where a user pays the smart contract 1% of the fare and receives a 100% refund if the flight is cancelled. In this example, a user might send amount of cryptocurrency to a smart contract address as the purchase fee, along with data identifying a specific airline flight (e.g., airline, flight number, and date). The smart contract records the wallet address from which the "insurance" was purchased, and then monitors the flight status of the requested flight. The smart contract might check publicly accessible APIs providing flight information and, if the flight was canceled, automatically send to the wallet from which the insurance was purchased, a refund in the amount of 100% of the fare (e.g., 100×PurchaseFee). This is just a simple example for illustrative purposes. There are an infinite number of examples of smart contracts, each of varying complexity.

Some blockchains, in addition to general smart contracts, allow users to create individual tokens that can be exchanged on the blockchain. For example, the Ethereum blockchain includes smart contracts that themselves define a new token, separate from Ethereum, that can also be exchanged and tracked on the Ethereum network. These separate tokens' behaviors may be defined by one or more standards on the Ethereum network, the most common of which is referred to as the ERC-20 standard. ERC-20 is the technical standard used for all smart contracts on the Ethereum blockchain for token implementation and provides a list of rules that all Ethereum-based tokens must follow. Today there are over 350,000 different ERC-20 token contracts on the Ethereum blockchain alone. It is therefore infeasible for a human to individually analyze the features of each new token's smart contract, including any inherent security risks it exposes, on Ethereum and other blockchains.

In view of the ability of smart contracts to operate autonomously, and further in view of the inability to alter a smart contract once it is deployed on a blockchain, it can be important to ensure that the smart contract (a software program originally created by humans) is not laden with bugs, acts as intended in all instances, does not expose unwanted risks, or does not include harmful code. This is the sort of source code review that, discussed above, is quite time and resource intensive, and for which better solutions are needed.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to techniques, methods, and systems for performing automatic analysis of smart contract software using one or more unique fingerprints or signatures based on flattened abstract syntax trees generated from the smart contract source code. For example, a risk assessment engine may automatically analyze a smart contract by first retrieving smart contract source code from a contract address on a blockchain where the smart contract is accessible. The risk assessment engine may generate an abstract syntax tree (AST) of the smart contract using a compiler for the smart contract source code, and then flatten the AST by removing non-differentiating elements from the AST. The flattened AST may be divided based on function calls within the smart contract, and then each division may be hashed using a one-way hash. The hash may be compared to a database of known functions to automatically identify one or more features of the smart contract, each having an associated risk level.

A first aspect described herein provides a computer implemented method for automatically detecting one or more features of a smart contract stored on a blockchain. Smart contract source code may be retrieved from a contract address on a blockchain, and an abstract syntax tree (AST) of the smart contract may be generated by parsing the smart contract source code. The AST may be flattened by removing all non-differentiating identifiers from the AST, and the flattened AST may then be hashed (e.g., using a one-way hash function). The hash may be used to automatically identify one or more features of the smart contract by querying a feature database for the hash of the flattened AST.

In some aspects, flattening may include dividing the AST to create a separate flattened AST based on each function call within the smart contract. During flattening, the non-differentiating identifiers may include source code comments and source code line references, among other non-differentiating items. The AST and/or flattened AST may be represented as a JavaScript Object Notation (JSON) structure or using different storage schemas.

In some aspects, after identifying one or more known features of the smart contract, a risk database may be queried to identify a level risk associated with each known feature. A smart contract risk level may be determined to be the highest risk associated with any of the one or more identified features, and a risk assessment report may be automatically generated based on the results from the analysis.

These and other aspects may be implemented as automated computerized methods, in one or more data processing systems operating substantially autonomously, as computer readable instructions (software) stored on one or more non-transitory computer readable media executable by a data processing system, or in any other statutory subject matter under 35 USC § 101.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 3A-3B (collectively, FIG. 3) depicts sample smart contract source code which may be analyzed using automatic smart contract analysis according to one or more illustrative aspects described herein.

FIG. 4A-4D (collectively, FIG. 4) depicts an abstract syntax tree (AST) based on the sample smart contract source code depicted in FIG. 3.

FIG. 5 depicts a flattened AST based on the AST depicted in FIG. 4.

FIG. 6 depicts a SHA-256 hash result based on a function within the flattened AST depicted in FIG. 5.

FIG. 7 depicts a signature record according to one or more illustrative aspects described herein.

FIG. 8 depicts a feature risk record according to one or more illustrative aspects described herein.

FIG. 9A-9C (collectively, FIG. 9) depicts a smart contract risk assessment report according to one or more illustrative aspects described herein.

FIGS. 13-17 illustrate source code comparisons according to one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

As a general introduction before discussing various elements in more detail below, one or more aspects described herein provide automatic smart contract feature analysis and risk assessment based on unique source code signatures or fingerprints within a smart contract on a blockchain. A risk assessment engine may automatically analyze a smart contract by first retrieving the smart contract source code from a contract address on a blockchain where the smart contract is accessible. The risk assessment engine may generate an abstract syntax tree (AST) of the smart contract using a compiler for the smart contract source code, and then flatten the AST by removing non-differentiating elements from the AST. The risk assessment engine may generate a single flattened AST, or may produce multiple flattened ASTs, e.g., one for each individual function defined in the smart contract source code. Each flattened AST may be hashed using a one-way hash, and then the hash can be stored as part of the signature and used as a fingerprint to query a database of known source code, thereby usable to automatically identify one or more previously seen features within the smart contract. Once the previously seen features are identified, the risk assessment engine can determine a risk level associated with each, determine a risk level associated with the smart contract as a whole, and automatically generate a risk assessment/report.

Figure 1:
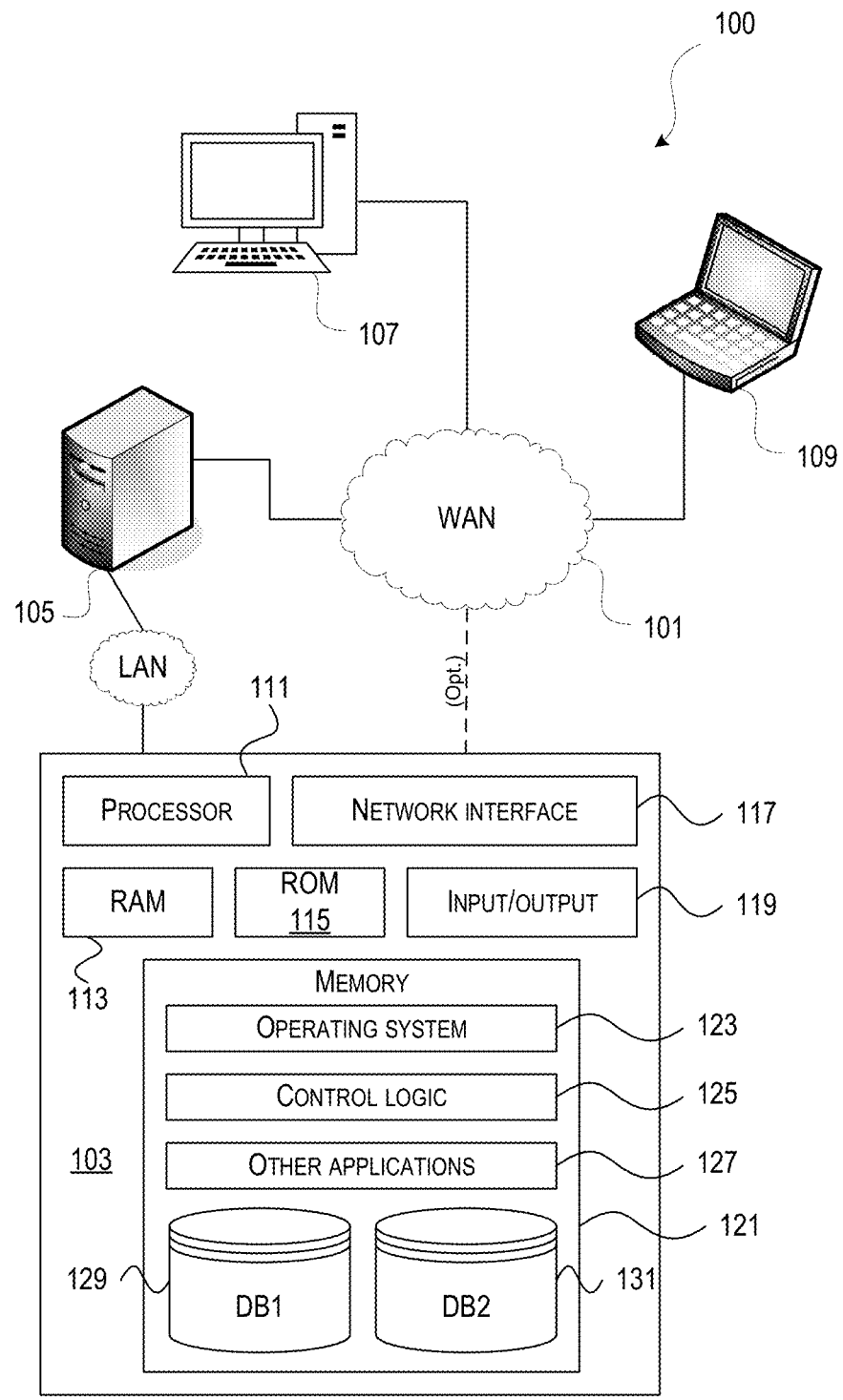
FIG. 1 depicts a network architecture that may be used to implement one or more illustrative aspects described herein.

FIG. 1 illustrates one example of a network architecture 100 that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, second server 105 (e.g., a web server, blockchain node, etc.), and client computers 107, 109. Data server 103 provides overall access, control and administration of databases and control software for performing one or more illustrative aspects described herein. Data server 103 may be connected to second server 105 through which users interact with and obtain data as requested. Alternatively, data server 103 may act or include the functionality of the second server itself and be directly connected to the Internet. Data server 103 may be connected to second server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access second server 105 using an Internet browser, as is known in the art, or by executing a software application that communicates with second server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device, e.g., laptops, desktops, tablets, smartphones, servers, micro-PCs, etc. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
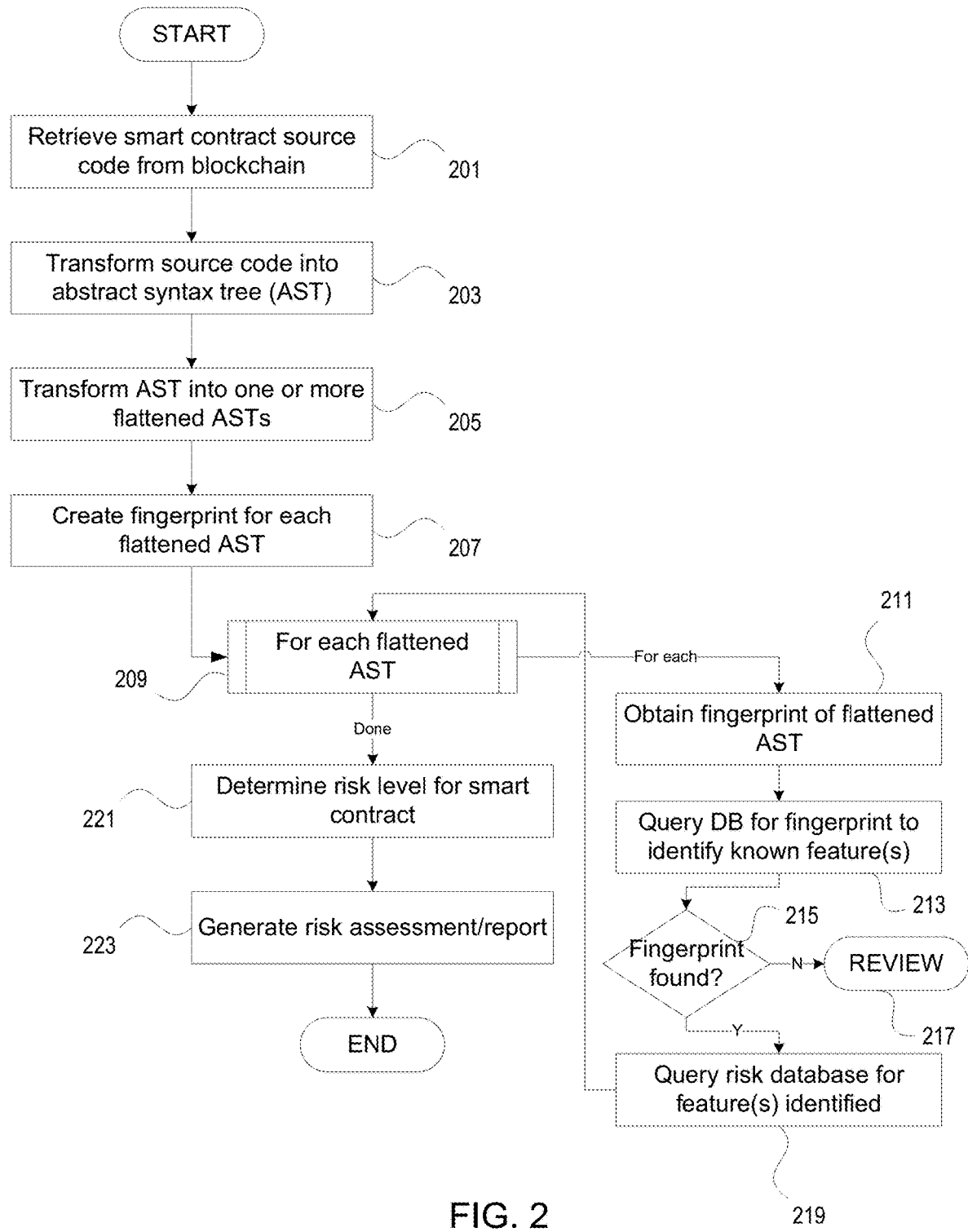
FIG. 2 depicts a method for performing automatic smart contract analysis according to one or more illustrative aspects described herein.

Turning now to FIG. 2, as discussed above a blockchain generally refers to a digital and distributed database, or ledger, of transactions, recorded and replicated in real time across a network of computers or nodes, such as those shown in FIG. 1. Every transaction is cryptographically validated via a consensus mechanism or protocol executed by the nodes before being permanently added as a new "block" at the end of the "chain" of data. There is no need for a central authority to approve the transaction, because the nodes in the network cryptographically confirm accuracy and agree via the consensus protocol before data is added— blockchains are thus referred to as peer-to-peer trustless systems. Blockchains that provide smart contract capabilities and, in particular, smart contracts providing for the creation of a new token, need to be reviewed for security risks before a cryptocurrency custodian or exchange service such as Coinbase Inc. implements support for that new token.

In order to support rapid deployment of new tokens on various blockchains, users and companies have developed standard libraries of smart contract source code that developers can use as a starting point. Those developers can then make additions and modifications to the smart contract based on the specific use-case for that token as needed. In addition, users can launch tokens on blockchains with incredible ease, resulting in over 350,000 tokens on the Ethereum blockchain alone. As a result, many token contracts contain a large percentage of source code that has been used before, yet each one must still be reviewed before support for that token might be adopted by a custodian or exchange such as Coinbase Inc. of San Francisco, Calif. Manual review of such a large number of token contracts is impractical and infeasible. By reducing the source code to its functional essence, and then comparing a fingerprint of that base level functionality to previously known source code used in smart contracts, the review of a single smart contract can be performed autonomously in minutes as compared to multiple weeks to perform a manual review of the same code. The risk analysis engine described herein can automatically review ~500 contracts/hour using present technology, as compared to 1 contract per 2 weeks when manual review is performed.

Starting in step 201, a risk analysis engine, e.g., control logic 125 executing on server 103 (FIG. 1), may download a smart contract from an address on a blockchain, e.g., if from the Ethereum blockchain, the public API exposed by Etherscan.io may be used. Other APIs and services can alternatively be used. During step 201 (or alternative within a different step, e.g., step 203 or 205), the source code may be analyzed to determine the source codes features including dependencies, functions, events, signatures, and the like.

FIG. 3A-3B shows a portion of the smart contract for the ChainLink token downloaded from contract address 0x514910771AF9Ca656af840dff83E8264EcF986CA on the Etherum blockchain network. Source code obtained from other sources may of course be analyzed as well. However, it is preferable to obtain smart contract source code directly from the contract address, to ensure that the source code is the version actually in use for the desired token.

Once the source code has been obtained, then in step 203 the source code is transformed into an abstract syntax tree (AST). An AST refers to a tree representation of the abstract syntactic structure of source code written in a programming language. Each node of the tree denotes a construct occurring in the source code. The syntax is "abstract" in the sense that it does not represent every detail appearing in the real syntax, but rather just the structural or content-related details. For instance, grouping parentheses are implicit in the tree structure, so these do not have to be represented as separate nodes. Similarly, a syntactic construct like an if-condition-then expression may be denoted by means of a single node with three branches. ASTs may be generated and used by compilers to represent the structure of program code, whereby the AST is typically generated during the syntax analysis phase of compilation. Thus, in step 203, the AST may be generated directly by the compiler. FIG. 4A-4D represent an AST generated during compilation of the smart contract source code illustrated in FIG. 3A-3B. As shown in FIG. 4, an AST may be represented in JavaScript Object Notation (JSON) format.

Next, in step 205 the AST is transformed into a flattened AST by removing non-differentiating identifiers from the AST, and removing extraneous formatting. Non-differentiating identifiers may include any material that does not affect the ultimate functionality of the source code. Some non-differentiating identified may include, but are not limited to, source code comments and line numbers, offsets, or other location identifiers of a particular function within the source code itself. In some embodiments the flattened AST may omit any functions within the smart contract that are unreachable, as may be determined by walking the AST call tree structure. FIG. 5 illustrates a flattened AST after transforming/flattening the AST depicted in FIG. 4.

Optionally, step 205 may further include or be subdivided into a precursor step of dividing the AST by function prior to flattening. In such a scenario, the AST would be separated based on logical divisions of source code in the smart contract, e.g., by function call/subroutine. Returning to the example of FIG. 5, a first AST to flattened AST transformation might be performed for the transferAndCall function, a second AST to flattened AST transformation might be performed for the transfer function, a third AST to flattened AST transformation might be performed for the approve function, and a fourth AST to flattened AST transformation might be performed for the transferFrom function. Each smart contract might have different numbers of functions, so each might support dividing the AST into a different number of functions prior to flattening.

After flattening is complete, each flattened AST represents a standardized version of the functionality of the source code (optionally based on individual function subroutines), without regard to minor variations between implementation that do not affect the functionality of the smart contract. As a result, two smart contracts having a same subroutine, but perhaps in different locations within the smart contract itself, should yield the same flattened AST with respect to that function, even if they were commented differently with the source code as well. On this basis, the risk assessment engine in step 207 creates a fingerprint for each flattened AST. A fingerprint merely refers to a unique identifier usable to represent the flattened AST, based on the content of the flattened AST itself. In one embodiment a hash of the flattened AST may be used, e.g., a one-way SHA-256 hash may be generated using the flattened AST as input. However, any fingerprint technology may be used that provides safeguards such that the fingerprint cannot be spoofed or refabricated without ingesting the flattened AST itself. For example, digital signatures may be used when there is a need for stronger cryptographic guarantees. FIG. 6 illustrates a sample SHA-256 hash generated from transferAndCall portion of the flattened AST depicted in FIG. 5.

Once the fingerprints are created, the risk assessment engine in step 209 may search a source code database (e.g., database 129 or 131) for matching fingerprints. In steps 211-213 the risk assessment engine queries the source code database for the fingerprint to see if that source code functionality has ever been ingested before through the risk assessment engine. In step 215, if the fingerprint is not found, it means the source code includes new functionality not previously reviewed, and the method in step 217 may be paused or forked for separate analysis of the new source code. Said analysis may be performed manually by a human analyst who reviews the source code to identify its operation and any weaknesses or risks exposed therein, or the analysis in step 217 may be performed autonomously via machine learning/AI analysis of the source code. Once the review in step 217 is complete, or if the fingerprint is found in the database already, then the query returns any signature records having a matching source code fingerprint. FIG. 7 illustrates an example of a signature record returned for the transferAndCall function. As shown in FIG. 7, the signature record may include the function name, fingerprint value, flattened AST data, documentation/description, mutability, and any known features or risks exposed by the source code. Mutability may refer to the ability of the function to change (i.e., mutate) the state of smart contract storage, e.g., by modifying variable data versus merely returning data, and thus may be tracked separately from other features or risks in the signature record.

Then, in step 219, the risk assessment engine may query a risk database (e.g., database 129 or 131) for any features identified within the signature record. In the present example, risk assessment engine 125 may query the risk database for the "externalcall" feature and the risks it presents. FIG. 8 illustrates a sample risk analysis record that may be returned in this example. The feature-risk record includes information about the risks the feature presents, including e.g., a risk score, summary, details, impact, and mitigations, as well as flags to indicate whether the feature should be monitored and alerted. When monitored, the risk analysis engine (or another module or device) may track occurrences of the function being triggered, and log those instances in an event log or other database. When alerted, calls to that function may trigger the risk analysis engine to send an alert message to another system or person for investigation and possible further remediation Based on the results of the analysis of all the flattened ASTs, in step 221 the risk assessment engine determines a risk level for the smart contract as a whole. In one embodiment the risk level for the smart contract may be determined as the maximum risk level associated with any one fingerprint/flattened AST. In other embodiments other risk scores may be used, e.g., a total of the risk scores associated with each fingerprint/flattened AST, or any other desired scoring system, e.g., that hierarchically represents risks.

Based on all the data ingested, transformed, queried, and analyzed, the risk assessment engine may automatically generate, in step 223, a report detailing its findings. A sample report is depicted in FIG. 9A-9C.

In some embodiments, the risk assessment engine may perform a second phase of automated review for each flattened AST (or otherwise based on function within the smart contract) in addition to or in place of steps 211-219, using machine learning, validation rules, or other AI-based technologies. For example, the risk assessment engine may apply predefined or learned rules to for detecting unknown and/or nonstandard functions to check any unconfirmed functions to ensure they do not affect wallet balances, provide superuser privileges, pause a transaction, affect state of one or more variables, etc. Variable state tracking may be used to determine whether the function can change the state (contents) of one or more key, important or critical variables. For example, changing the state of the "owner" variable may affect who can perform superuser actions, and introduces risk into use of that asset.

In some embodiments, the risk analysis engine may generate and/or use a reputation score associated with each fingerprint based on how often the fingerprint appears or is used. As one example, a transfer( ) function which is used in 1000+ smart contracts might have a lower risk score than a uniqueTransfer( ) function which appears in only one previously reviewed smart contract, optionally even when the functions include similar or identical functionality. In another example, a smart contract that reuses source code from another trusted smart contracts might have a lower risk score than a smart contract that contains source code which only appears in other higher risk or untrusted smart contracts.

As another example, the risk analysis engine may generate, parse and compare function implementation and grammar of a smart contract. Again, the function signatures within a smart contract may be based on Abstract Syntax Tree (AST) structures as opposed to raw source code. This level of abstraction allows the risk analysis engine to efficiently understand and compare contract logic as opposed to idiosyncrasies of a particular implementation.

Figures 10, 11, 12:
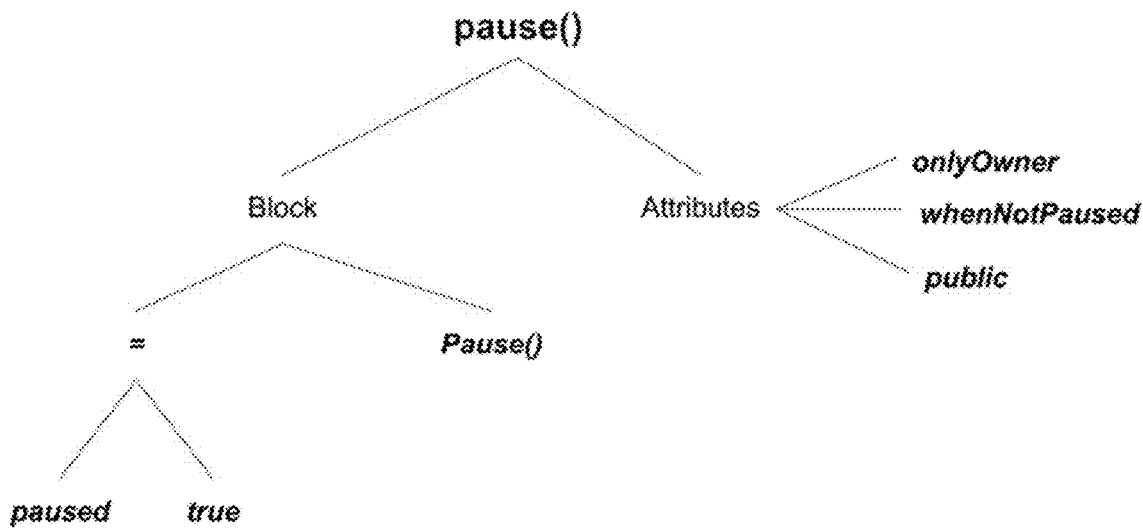
FIG. 10 illustrates a sample pause( ) function which may be used in a smart contract, according to one or more illustrative aspects described herein.
FIG. 11 illustrates an abstract syntax tree of the pause( ) function depicted in FIG. 10 according to one or more illustrative aspects described herein.
FIG. 12 illustrates a flattened AST of the pause( ) function depicted in FIG. 10 according to one or more illustrative aspects described herein.

FIG. 10 illustrates a pause( ) function which may be used in a smart code contract, and which has various associated risks. FIG. 11 illustrates an abstract syntax tree (AST) of the functionality of the pause( ) function depicted in FIG. 10. FIG. 12 then depicts a flattened AST of the pause( ) function depicted in FIG. 10. Table 1 below depicts an example signature corresponding to the pause( ) function:

TABLE 1

Sample Signature of pause ( ) funtion.

{
"Hash": "7d7f223453766959e095a96b53bb623390847acf70bcaaf7904bf1d47af0605c",
"Name": "pause( )",
"Mutability": "nonpayable",
"Sig":
"FunctionDefinition|constant:false|implemented:true|isConstructor:false|name:pause|payable:false|vis
"Source": [
"signatures/custom/RepublicToken.sol:2114:88:0",
"signatures/openzeppelin/openzeppelin-contracts-1.3.0/contracts/lifecycle/Pausable.sol:666:85:0",
"signatures/openzeppelin/openzeppelin-contracts-1.4.0/contracts/lifecycle/Pausable.sol:666:85:0",
"signatures/openzeppelin/openzeppelin-contracts-1.5.0/contracts/lifecycle/Pausable.sol:666:85:0",
"signatures/openzeppelin/openzeppelin-contracts-1.6.0/contracts/lifecycle/Pausable.sol:666:85:0",
"signatures/openzeppelin/openzeppelin-contracts-1.7.0/contracts/lifecycle/Pausable.sol:666:85:0",
"signatures/custom/WaxToken.sol:7917:88:0"
],
"Doc": "@dev called by the owner to pause, triggers stopped state\r"
}

Based on comparisons in the risk analysis engine database, the signature above can be determined to match the pause( ) function implementation previously found in the Republic Token, shown below in Table 2.

TABLE 2 function pause( ) onlyOwner whenNotPaused public {
paused = true;
Pause( );
}

However, the signature does not match a slightly different implementation previously found in the Flexa Coin, as shown below in Table 3.

TABLE 3 function pause( ) onlyOwner whenNotPaused public {
paused = true;
emit Pause ( );
}

The risk analyses engine may compare signatures and/or fingerprints (e.g., hashes) to a library of 3000+ signatures and/or fingerprints based on unique functions discovered in standard libraries like every release of OpenZeppelin as well as every smart contract that was previously analyzed by the risk analysis engine. When supplied with a new smart contract, the risk analysis engine attempts to match function signatures in the new contract against a list of signatures in the library. If all functions are known, then the risk analysis engine can produce a complete assessment of the contract without requiring analyst intervention. Alternatively, it will record any newly discovered signatures in its internal database after an analyst or security engineer assesses the function risk. FIGS. 13-18 illustrate sample comparisons using an oft-used pause( ) function as an example. FIG. 13 illustrates a match based on identical code. FIG. 14 illustrates a non-match resulting from the oh (O) in "Owner" being switched to a zero, i.e., "Owner". FIG. 15 illustrates a match because comments are ignored, and functionality is otherwise the same. FIG. 16 illustrates a non-match because the Boolean value has been changed. FIG. 17 illustrates a non-match resulting changing the order of lines in the source code.

Each of the function signatures have an associated feature-set which help define any associated risks and risk scores. For example, the signature in Table 1 results in pausing and superuser features being identified as shown in Table 4.

TABLE 4

{
"Hash":
"7d7f223453766959e095a96b53bb623390847acf70bcaaf7904bf1d47af0605c",
"Name": "pause( )",
"Source": [
"signatures/openzeppelin/openzeppelin-contracts-
1.3.0/contracts/lifecycle/Pausable.so1:666:85:0"
],
"Features": [
"pausing",
"superuser"
]
}

Each of the features may have an associated risk definition. For example, the feature pausing may have the definition shown in Table 5.

TABLE 5

"pausing": {
"Score": 3,
"Description": "Superuser may pause the entire contract.",
"Monitor": true,
"Alert": true,
"Mitigations": [
"revokepriv",
"multisig",
"key custody",
"decentralized",
"circuitbreaker"
]
}

When the above definition is used, the risk analysis engine will automatically score any function with the pausing feature with a risk rating of 3. The risk analysis engine may also require both Circuit Breaker monitoring and Pager Duty alerting whenever it is executed on the blockchain. Finally, the definition may identify one or more mitigations that may be the used to further reduce the risk score.

As an example of a mitigation, the revokepriv mitigation may be associated with a risk mitigation where an asset issuer completely revokes their right to ever execute a particular function. That mitigation may be further defined as shown in Table 6:

TABLE 6

"revokepriv": {
"Score": 1,
"Description": "Superuser privileges are renounced or somehow restricted"
}

The mitigation score of 1 indicated in Table 6 is the lowest residual risk of the function regardless of its inherent risk, if the mitigation is implemented.

Using the innovations described above and herein, a cryptocurrency virtual asset service provider (VASP) can maintain high security while increasing the speed of security reviews and adoption of new tokens. To any extent that manual review if still required after completing the automated process, the system generates all the data needed for a successful analysis in one place. The risk assessment engine minimizes the amount of source code an analyst needs to review, and makes the most efficient use of an analyst's time doing manual reviews by minimizing the amount of time spent on reporting, formatting, and other low value tasks.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A method, comprising:
retrieving smart contract source code for a smart contract from a contract address on a blockchain where the smart contract is stored;
generating an abstract syntax tree (AST) by parsing the smart contract source code;
dividing the AST to create one or more ASTs, wherein each respective AST, of the one or more ASTs, is associated with a function call within the smart contract source code;
flattening each respective AST, of the one or more ASTs, by removing all non-differentiating identifiers and extraneous formatting;
generating a unique fingerprint identifying each respective flattened AST of the one or more flattened ASTs;
identifying, one or more features of the smart contract by querying a feature database using the unique fingerprint associated with each respective flattened AST;
determining a risk level associated with each of the identified one or more features; and
performing a remedial action based on the determined risk levels.

2. The method of claim 1, wherein the non-differentiating identifiers comprise source code comments.

3. The method of claim 1, wherein the non-differentiating identifiers comprise source code line references.

4. The method of claim 1, wherein generating the AST comprises generating, by a compiler, a JavaScript Object Notation (JSON) data structure representative of the AST.

5. The method of claim 1, wherein determining the risk level comprises querying a risk database for each of the one or more identified features to obtain a risk level associated with each feature.

6. The method of claim 1, wherein performing the remedial action comprises automatically generating a smart contract risk level based on the determined risk levels.

7. The method of claim 6, wherein the smart contract risk level is generated based on a highest risk level from the determined risk levels.

8. The method of claim 1, wherein generating the unique fingerprint associated with each respective flattened AST of the one or more flattened ASTs comprises hashing each respective flattened AST using a one-way hash function.

9. The method of claim 1, wherein performing the remedial action comprises automatically generating a report comprising each of the one or more identified features, the risk level associated with each of the one or more identified features, and a risk level associated with the smart contract.

10. One or more non-transitory computer readable media storing computer readable instructions that, when executed by a data processing device, configure the data processing device to perform:
retrieving smart contract source code for a first smart contract from a contract address on a blockchain where the smart contract is stored;
generating an abstract syntax tree (AST) by parsing the smart contract source code;
dividing the AST to create one or more ASTs, wherein each respective AST, of the one or more ASTs, is associated with a function call within the smart contract source code:
flattening each respective AST, of the one or more ASTs, by removing all non-differentiating identifiers from the AST and extraneous formatting;
generating a unique fingerprint identifying each respective flattened AST of the one or more flattened ASTs;
identifying one or more features of the smart contract by querying a feature database for using the unique fingerprint associated with each respective flattened AST;
determining a risk level for each of the one or more identified features by querying a risk database for each feature to obtain a corresponding risk level;
determining a risk level associated with the smart contract based on the risk levels associated with each of the one or more identified features; and
automatically generating a report comprising each of the one or more identified feature, the risk level corresponding to each of the one or more identified features, and the risk level associated with the smart contract.

11. The one or more non-transitory computer readable media of claim 10, wherein the non-differentiating identifiers comprise source code comments.

12. The one or more non-transitory computer readable media of claim 10, wherein the non-differentiating identifiers comprise source code line references.

13. The one or more non-transitory computer readable media of claim 10, wherein the computer readable instructions, when executed by the data processing device, configure the data processing device to generate the AST by generating, using a compiler, a JavaScript Object Notation (JSON) data structure representative of the AST.

14. The one or more non-transitory computer readable media of claim 10, wherein the computer readable instructions, when executed by the data processing device, configure the data processing device to determine the smart contract risk level based on a highest risk level from the risk levels associated with each of the one or more identified features.

15. The one or more non-transitory computer readable media of claim 10, wherein the computer readable instructions, when executed by the data processing device, configure the data processing device to generate the unique fingerprint associated with each respective flattened AST by hashing each respective flattened AST using a one-way hash function.

16. A method comprising:
retrieving smart contract source code for a smart contract from a contract address on a blockchain where the smart contract is stored;
generating, using a compiler compatible with the smart contract source code, an abstract syntax tree (AST);
dividing the AST to create one or more ASTs, wherein each respective AST, of the one or more ASTs, is associated with a function call within the smart contract source code;
flattening each respective AST, of the one or more ASTs, by removing all non-differentiating identifiers and extraneous formatting;
generating, using a one-way hash function, a unique fingerprint identifying each respective flattened AST;
identifying, for each flattened AST, one or more features of the smart contract by querying a feature database for using the unique fingerprint of associated with each respective the flattened AST;
determining a risk level for each of the one or more identified features by querying a risk database, for each feature, to obtain a corresponding risk level;
determining a risk level associated with the smart contract by determining a highest risk level associated with any of the identified features; and
performing a remedial action based on the determined risk levels.

17. The method of claim 16, wherein the non-differentiating identifiers comprise at least one of source code comments and or source code line references.

18. The method of claim 16, wherein the remedial action comprises automatically generating a report comprising each of the one or more identified features, the risk level corresponding to each of the one or more identified features, and the risk level associated with the smart contract.

19. The method of claim 1, further comprising:
omitting a first AST, of the one or more ASTs, from a risk analysis determination based on a determination that the first AST is associated with an unreachable function call.

20. The one or more non-transitory computer readable media of claim 10, wherein the computer readable instructions, when executed by the data processing device, configure the data processing device to omit a first AST, of the one or more ASTs, from a risk analysis determination based on a determination that the first AST is associated with an unreachable function call.

* * * * *